(12) United States Patent
Dagani et al.

(10) Patent No.: US 11,763,521 B2
(45) Date of Patent: Sep. 19, 2023

(54) METHOD AND APPARATUS FOR THE AUTOMATION OF VARIABLE RATE SHADING IN A GPU DRIVER CONTEXT

(71) Applicant: Samsung Electronics Co., Ltd., Suwon-si (KR)

(72) Inventors: Gabriel T. Dagani, Austin, TX (US); Gregory Bergschneider, Frederick, CO (US); David C. Tannenbaum, Austin, TX (US)

(73) Assignee: SAMSUNG ELECTRONICS CO., LTD.

( * ) Notice: Subject to any disclaimer, the term of this patent is extended or adjusted under 35 U.S.C. 154(b) by 0 days.

(21) Appl. No.: 17/495,804

(22) Filed: Oct. 6, 2021

(65) Prior Publication Data

US 2023/0052075 A1  Feb. 16, 2023

Related U.S. Application Data

(60) Provisional application No. 63/233,203, filed on Aug. 13, 2021.

(51) Int. Cl.
| | |
|---|---|
| *G06T 15/80* | (2011.01) |
| *G06T 1/20* | (2006.01) |
| *G06T 15/00* | (2011.01) |
| *G06T 15/50* | (2011.01) |

(52) U.S. Cl.
CPC .............. *G06T 15/80* (2013.01); *G06T 1/20* (2013.01); *G06T 15/005* (2013.01); *G06T 15/503* (2013.01)

(58) Field of Classification Search
CPC ......... G06T 15/80; G06T 1/20; G06T 15/005; G06T 15/503; G06T 2200/28
See application file for complete search history.

(56) References Cited

U.S. PATENT DOCUMENTS

| | | | |
|---|---|---|---|
| 10,152,819 B2 | 12/2018 | Grossman et al. | |
| 10,192,280 B2 | 1/2019 | Saleh et al. | |
| 10,504,281 B2 | 12/2019 | Nevraev et al. | |
| 10,510,185 B2 | 12/2019 | Saleh et al. | |
| 10,867,434 B2 * | 12/2020 | Nevraev | G06T 15/04 |
| 10,930,022 B2 * | 2/2021 | Yang | G06T 15/06 |
| 2013/0106853 A1 * | 5/2013 | Lawrence | G06T 11/40 |
| | | | 345/423 |
| 2020/0202594 A1 | 6/2020 | Saleh et al. | |
| 2020/0389672 A1 * | 12/2020 | Kennett | G06T 3/4046 |
| 2021/0407183 A1 * | 12/2021 | Guo | G06T 15/005 |

* cited by examiner

*Primary Examiner* — Said Broome
*Assistant Examiner* — Donna J. Ricks
(74) *Attorney, Agent, or Firm* — Renaissance IP Law Group LLP

(57) ABSTRACT

A system and a method are disclosed for varying a pixel-rate functionality of a GPU as an optional feature without an explicit implementation from within an application. User interface (UI) content may be detected in a draw call of an application and a variable-rate shader lookup map may be generated based on the detected UI content. A pixel rate of 3D content may be increased using the variable-rate shader lookup map. Additionally or alternatively, other conditions may be detected for increasing the pixel rate, such as using information in an application profile, detecting high or low luminance values, detecting motion and/or detecting temporal anti-aliasing.

20 Claims, 5 Drawing Sheets

| Vertex Data | Shader | Timing | Texture | Depth Test |
|---|---|---|---|---|
| (diagonal line in box) | Specific shaders may be detected as bound to the pipeline that are used for UI. These shaders may not use skinning, or high dynamic range coloring | A 2D UI is typically rendered during the last render pass of a frame | Font Textures may be detected by indexing into a single texture in small equal box sizes | A depth test is Typically disabled for a 2D UI during a draw |
| Two triangles are detected as a box, which may indicate a 2D UI overlay | | | | |
| 308a | 308b | 308c | 308d | 308e |

METHOD AND APPARATUS FOR THE AUTOMATION OF VARIABLE RATE SHADING IN A GPU DRIVER CONTEXT

CROSS-REFERENCE TO RELATED APPLICATION

This application claims the priority benefit under 35 U.S.C. § 119(e) of U.S. Provisional Application No. 63/233,203, filed on Aug. 13, 2021, the disclosure of which is incorporated herein by reference in its entirety.

TECHNICAL FIELD

The subject matter disclosed herein relates to graphic processing units (GPUs). More particularly, the subject matter disclosed here relates to a system and method for varying a pixel-rate functionality of a GPU as an optional feature without an explicit implementation from within an application.

BACKGROUND

With the advent of 4K and 8K digital screens, the number of pixels rendered by GPUs has grown at a steep rate. GPUs are increasingly unable to perform the processing required to support new graphical/photorealistic rendering techniques while rendering all the pixels at 60-240 frames per second (FPS). To compensate for this large amount of processing, shortcuts exist to reduce the workload of rendering engines while keeping the picture quality subjectively unaffected.

One of the shortcut techniques is referred to as variable rate shading (VRS). Variable rate shading is a technique of duplicating single pixels into blocks of pixels sized in multiples like so: 2×1, 1×2, 2×2, 2×4, 4×2, or 4×4. VRS may use a frame buffer mask to dictate which pixels are duplicated into which sized blocks; a pixel rate calculation per material; or a pixel rate per draw. VRS may be setup by an application or a game when the feature is exposed by a graphics driver. Application/game writers may select how to use this feature selecting a degree of pixel processing savings vs. degradation of picture quality. For applications that are no longer in development or maintenance, however, this feature is too new and will not be exploited for those applications.

SUMMARY

An example embodiment provides a method to vary pixel rate in a GPU in which the method may include: detecting, by the GPU, user interface (UI) content in a draw call of an application; generating, by the GPU, a variable-rate shader lookup map based on at least one location of detected UI content in the draw call; and increasing, by the GPU, a pixel rate of 3D content of the draw call based on the variable-rate shader lookup map. In one embodiment, the method may further include determining, by the GPU, at least one location in the 3D content that corresponds to a predetermined luminance-value threshold or a predetermined luminance spatial-frequency threshold in which generating the variable-rate shader lookup map may be further based on the at least one location in the 3D content that corresponds to the predetermined luminance-value threshold or the predetermined luminance spatial-frequency threshold. In another embodiment, the at least one location in the 3D content may include a location having a luminance value that is less than the predetermined luminance-value threshold or luminance spatial-frequency value that is less than the predetermined luminance spatial-frequency threshold. In still another embodiment, the at least one location in the 3D content may include a location having a luminance value that is greater than the predetermined luminance-value threshold or a luminance spatial-frequency value that is greater than the predetermined luminance spatial-frequency threshold. In yet another embodiment, the method may further include determining at least one location in the 3D content that corresponds to a predetermined motion-estimation threshold in which generating the variable-rate shader lookup map may be further based on the at least one location in the 3D content that corresponds to the predetermined motion-estimation threshold. In one embodiment, detecting UI content in the draw call may include detecting the UI content based on a profile of the application. In another embodiment, the method may further include detecting, by the GPU, a post-processing temporal anti-aliasing buffer or data that corresponds to temporal anti-aliasing that is used for the variable-rate shader lookup map. In still another embodiment, detecting UI content in the draw call may include at least one of: determining that the draw call comprises a 2D draw call based on two triangles being detected as a box; determining that the draw call comprises a 2D draw call based on detecting a shader that is bound to a pipeline of the GPU that will be used for a UI; determining that the draw call comprises a 2D draw call based on detecting that the draw call does not use skinning or high-dynamic range coloring to render the draw; determining that the draw call comprises a 2D draw call based on determining that the draw call is rendered during a last pass of a frame; determining that the draw call comprises a 2D draw call based on determining a single texture is indexed into small equal box sizes to indicate font retrieval; or determining that the draw call comprises a 2D draw call based on determining that a depth test for the draw call is disabled, a draw-call order or rendering quadrants of the draw call.

An example embodiment provides a method to vary pixel rate in a GPU in which the method may include: determining, by the GPU, at least one location in 3D content of a draw call of an application that corresponds to a predetermined luminance-value threshold, a luminance spatial-frequency threshold, or a predetermined motion-estimation threshold; generating, by the GPU, a variable-rate shader lookup map based on at least one location that corresponds to the predetermined luminance-value threshold, the predetermined luminance spatial-frequency threshold, or the predetermined motion-estimation threshold; and increasing, by the GPU, a pixel rate of the 3D content corresponding the at least one location corresponding to the predetermined luminance-value threshold, the predetermined luminance spatial-frequency threshold, or the predetermined motion-estimation threshold. In one embodiment, the at least one location in the 3D content corresponds to a location having a luminance value that is less than the predetermined luminance-value threshold, a luminance spatial-frequency value that is less than the predetermined luminance spatial-frequency value, or a motion-estimation value that is less than the predetermined motion-estimation value threshold. In another embodiment, the at least one location in the 3D content corresponds to a location having a luminance value that is greater than the predetermined luminance-value threshold, a luminance spatial-frequency value that is greater than the predetermined luminance spatial-frequency value, or a motion-estimation value that is greater than the predetermined motion-estimation value threshold. In still another embodiment, the method may further include detecting, by the GPU, a post-processing temporal anti-aliasing buffer or data that corresponds to temporal anti-aliasing that is used for the variable-rate shader lookup map. In still another embodiment, the method may further include detecting, by the GPU, UI content in the draw call in which generating the variable-rate shader lookup map may further include generating the variable-rate shader lookup map further based on at least one location of detected UI content in the draw call in which increasing the pixel rate of the 3D content may be further based on the at least one location of detected UI content. In yet another embodiment, detecting UI content in the draw call may further include detecting the UI content based on a profile of the application. In one embodiment, detecting UI content in the draw call comprises at least one of: determining that the draw call comprises a 2D draw call based on two triangles being detected as a box; determining that the draw call comprises a 2D draw call based on detecting a shader that is bound to a pipeline of the GPU that will be used for a UI; determining that the draw call comprises a 2D draw call based on detecting that the draw call does not use skinning or high-dynamic range coloring to render the draw; determining that the draw call comprises a 2D draw call based on determining that the draw call is rendered during a last pass of a frame; determining that the draw call comprises a 2D draw call based on determining a single texture is indexed into small equal box sizes to indicate font retrieval; or determining that the draw call comprises a 2D draw call based on determining that a depth test for the draw call is disabled, a draw-call order or rendering quadrants of the draw call.

An example embodiment provides a GPU that may include a graphics pipeline and a controller. The graphics pipeline may be configured to increase a pixel rate of rendered content. The controller may be coupled to the graphics pipeline, and the controller may be configured to: UI content in a draw call of an application or at least one location in 3D content of the draw call that corresponds to a predetermined luminance-value threshold, a predetermined luminance spatial-frequency threshold, or to a predetermined motion-estimation threshold; generate a variable-rate shader lookup map based on the at least one location of detected UI content in the draw call and the at least one location in the 3D content that corresponds to the predetermined luminance-value threshold, the predetermined luminance spatial-frequency threshold, or the predetermined motion-estimation threshold; and increase a pixel rate of the 3D content corresponding based on the variable-rate shader lookup map. In one embodiment, the at least one location in the 3D content may include a location having a luminance value that is less than the predetermined luminance-value threshold, a luminance spatial-frequency value that is less than the predetermined luminance spatial-frequency value, or a motion-estimation value that is less than the predetermined motion-estimation value threshold. In another embodiment, the at least one location in the 3D content may include a location having a luminance value that is greater than the predetermined luminance-value threshold, a luminance spatial-frequency value that is greater than the predetermined luminance spatial-frequency value, or a motion-estimation value that is greater than the predetermined motion-estimation value threshold. In still another embodiment, detecting UI content in the draw call may include detecting the UI content based on a profile of the application. In yet another embodiment, the controller may be further configured to detect a post-processing temporal anti-aliasing buffer or related data that corresponds to temporal anti-aliasing that is used for the variable-rate shader lookup map.

BRIEF DESCRIPTION OF THE DRAWING

In the following section, the aspects of the subject matter disclosed herein will be described with reference to exemplary embodiments illustrated in the figures, in which:

FIG. 4 depicts some example 2D detection methods that may be part of a 2D detection profile according to the subject matter disclosed herein.

DETAILED DESCRIPTION

Figure 1:
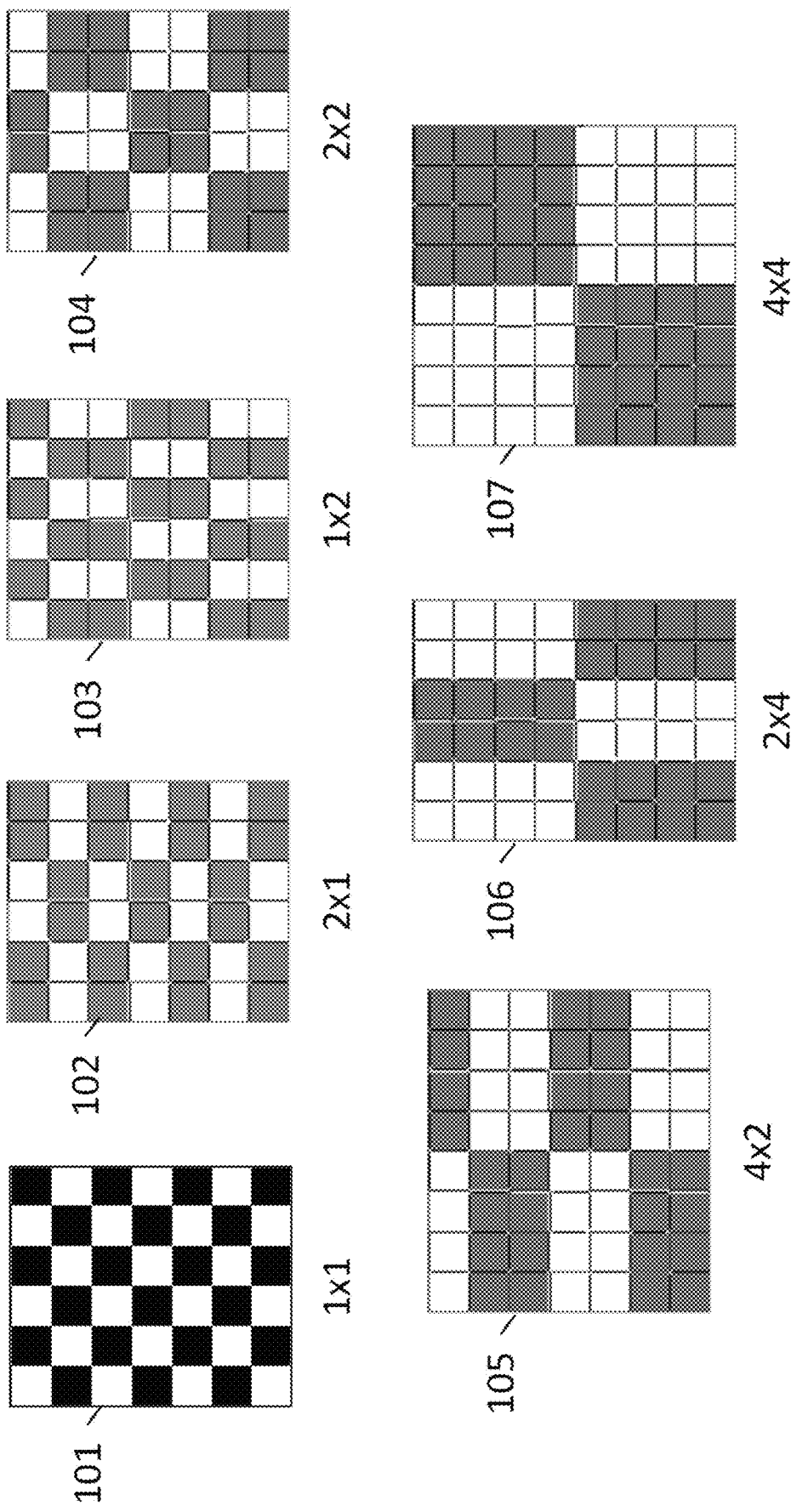
FIG. 1 depicts typical visual images for different VRS pixel-rate variations provided by commercially available GPUs.

In the following detailed description, numerous specific details are set forth in order to provide a thorough understanding of the disclosure. It will be understood, however, by those skilled in the art that the disclosed aspects may be practiced without these specific details. In other instances, well-known methods, procedures, components and circuits have not been described in detail to not obscure the subject matter disclosed herein.

Reference throughout this specification to "one embodiment" or "an embodiment" means that a particular feature, structure, or characteristic described in connection with the embodiment may be included in at least one embodiment disclosed herein. Thus, the appearances of the phrases "in one embodiment" or "in an embodiment" or "according to one embodiment" (or other phrases having similar import) in various places throughout this specification may not necessarily all be referring to the same embodiment. Furthermore, the particular features, structures or characteristics may be combined in any suitable manner in one or more embodiments. In this regard, as used herein, the word "exemplary" means "serving as an example, instance, or illustration." Any embodiment described herein as "exemplary" is not to be construed as necessarily preferred or advantageous over other embodiments. Additionally, the particular features, structures, or characteristics may be combined in any suitable manner in one or more embodiments. Also, depending on the context of discussion herein, a singular term may include the corresponding plural forms and a plural term may include the corresponding singular form. Similarly, a hyphenated term (e.g., "two-dimensional," "pre-determined," "pixel-specific," etc.) may be occasionally interchangeably used with a corresponding non-hyphenated version (e.g., "two dimensional," "predetermined," "pixel specific," etc.), and a capitalized entry (e.g., "Counter Clock," "Row Select," "PIXOUT," etc.) may be interchangeably used with a corresponding non-capitalized version (e.g., "counter clock," "row select," "pixout," etc.).

Such occasional interchangeable uses shall not be considered inconsistent with each other.

Also, depending on the context of discussion herein, a singular term may include the corresponding plural forms and a plural term may include the corresponding singular form. It is further noted that various figures (including component diagrams) shown and discussed herein are for illustrative purpose only, and are not drawn to scale. For example, the dimensions of some of the elements may be exaggerated relative to other elements for clarity. Further, if considered appropriate, reference numerals have been repeated among the figures to indicate corresponding and/or analogous elements.

The terminology used herein is for the purpose of describing some example embodiments only and is not intended to be limiting of the claimed subject matter. As used herein, the singular forms "a," "an" and "the" are intended to include the plural forms as well, unless the context clearly indicates otherwise. It will be further understood that the terms "comprises" and/or "comprising," when used in this specification, specify the presence of stated features, integers, steps, operations, elements, and/or components, but do not preclude the presence or addition of one or more other features, integers, steps, operations, elements, components, and/or groups thereof.

It will be understood that when an element or layer is referred to as being on, "connected to" or "coupled to" another element or layer, it can be directly on, connected or coupled to the other element or layer or intervening elements or layers may be present. In contrast, when an element is referred to as being "directly on," "directly connected to" or "directly coupled to" another element or layer, there are no intervening elements or layers present. Like numerals refer to like elements throughout. As used herein, the term "and/or" includes any and all combinations of one or more of the associated listed items.

The terms "first," "second," etc., as used herein, are used as labels for nouns that they precede, and do not imply any type of ordering (e.g., spatial, temporal, logical, etc.) unless explicitly defined as such. Furthermore, the same reference numerals may be used across two or more figures to refer to parts, components, blocks, circuits, units, or modules having the same or similar functionality. Such usage is, however, for simplicity of illustration and ease of discussion only; it does not imply that the construction or architectural details of such components or units are the same across all embodiments or such commonly-referenced parts/modules are the only way to implement some of the example embodiments disclosed herein.

Unless otherwise defined, all terms (including technical and scientific terms) used herein have the same meaning as commonly understood by one of ordinary skill in the art to which this subject matter belongs. It will be further understood that terms, such as those defined in commonly used dictionaries, should be interpreted as having a meaning that is consistent with their meaning in the context of the relevant art and will not be interpreted in an idealized or overly formal sense unless expressly so defined herein.

As used herein, the term "module" refers to any combination of software, firmware and/or hardware configured to provide the functionality described herein in connection with a module. For example, software may be embodied as a software package, code and/or instruction set or instructions, and the term "hardware," as used in any implementation described herein, may include, for example, singly or in any combination, an assembly, hardwired circuitry, programmable circuitry, state machine circuitry, and/or firmware that stores instructions executed by programmable circuitry. The modules may, collectively or individually, be embodied as circuitry that forms part of a larger system, for example, but not limited to, an integrated circuit (IC), system-on-a-chip (SoC), an assembly, and so forth.

In one embodiment, the subject matter disclosed herein provides a graphics driver that provides an automatic VRS functionality as an optional feature without an explicit implementation from within an application or game. In one embodiment, the subject matter disclosed herein provides a method in the graphics driver to parse existing rendered content and to provide VRS to improve performance without perceptible loss in image quality. Accordingly, older games that do not have the necessary three-dimensional (3D) engine features may be able to take advantage of VRS functionality to provide an increased frames per second (or for power savings) without unwanted visually displayed artifacts. In one embodiment, an end user is able to enable/disable/adjust the automatic VRS provided herein using, for example, a control panel or a configuration menu.

In another embodiment, a graphics driver identifies two-dimensional (2D) User Interface (UI) portions of a frame during a rendering process and makes a VRS map based on the UI for use in subsequent frames so that 3D portions of the content that are hidden by the 2D UI may have a pixel rate that can be maximized. The graphics driver may analyze an immediately previous (Frame N−1) or near-immediate previous frame (Frame N−X) of 3D content for, for example, one or more of the following conditions: (1) a minimum change in color gradient over area (mid tones); (2) regions of dark color below a luminance-value threshold (common-compression technique), (3) regions of very bright color above a luminance-value threshold (common-compression technique), regions of luminal spatial-frequency greater than a detectible threshold (common-compression technique), (4) motion-estimation information that may be used to increase pixel rate for certain areas because a larger motion may make an increased pixel rate changes less noticeable; and (5) detection of Temporal Anti-Aliasing (TAA) to determine where smoothing is being performed using prior frame knowledge to more aggressively set VRS pixel rate levels.

The subject matter disclosed herein may also provide a GPU driver that may use an application profile to determine how to isolate a 2D UI content from 3D content. Additionally or alternatively, the GPU driver may detect post-processes and create a VRS map (whole framebuffer, or in tiles) by detecting UI overlays, and potential areas of a frame buffer that a pixel-rate change may have limited visual detection.

Automatic VRS functionality as disclosed herein may be provided by any device, such as a mobile application processor (AP), but is not limited to a mobile AP, and may be used for any computer system that makes use of a one or more central processing units (CPUs), GPUs, and neural processing units (NPUs) and display processing units (DPUs). An AP may include a GPU (or another engine) capable of a VRS changing of a pixel rate based on screen-space, draw call and/or draw material. Additionally, the GPU may include hardware improvements to accelerate optical flow/motion estimation based on sequential framebuffer comparison. The GPU may include physical implementations of frame-buffer overlays, whereas the overlays may be used to indicate 2D UI screen-space positions for use with automated VRS. The GPU may be enabled from a configuration option that is provided by a graphics driver so that an application that is not currently utilizing VRS may utilize VRS. A neural network (NN) may also be trained to provide various maps and parameters for Tier 1 and Tier 2 VRS. Every $n^{th}$ frame may be updated, and VRS may be disabled to use ground-truth information. As used herein, the term "Tier 2 VRS" refers to a VRS technique that uses a screen-space lookup map to define which pixels to draw at specific pixel rates, and the term "Tier 1 VRS" refers to a VRS technique that has a much finer granularity than Tier 2 VRS and is usually defined by an application in which the pixel rate may be changed per draw call. The subject matter disclosed herein is applicable to both Tier 1 and Tier 2 VRS. For Tier 1 VRS, application profiles may be used to define which draws may be degraded.

The subject matter disclosed herein also provides a system and a method for automating VRS. In one embodiment, the system may include a GPU that has support for a tier-2 VRS functionality and that may use one or more pixel-rate lookup maps for determining pixel output. A pixel-rate lookup map may be generated from meta data inside a graphics-device driver or based on analysis of output pixel buffers. Meta data may be used to generate pixel-rate lookup for UI isolation within the driver by one or more positions of UI elements that indicate screen-space where VRS may increase pixel output per shader output because the UI will cover these pixel regions. Meta data may also be used by detecting temporal anti-aliasing (TAA) within an application by using a post-processing TAA buffer as a potential pixel rate lookup map. Analysis of output pixel buffers may include, but is not limited to analysis of luminance-value thresholds (high or low luminance) or luminance spatial-frequency thresholds as providing an indicator of areas on a frame buffer where pixel rates may be increased due to known limits of human perception, and motion estimation comparisons of multiple sequential frames to indicate potential blurred areas, which may indicate areas wherein pixel rates may be increased.

A graphics driver may be configured to automatically use VRS and that may be aided by an application or game profile that includes hints that may indicate for the application how to identify UI elements, render target/buffers and image correlation relative to games. The render target/buffers may be used by an application for calculating temporal anti-aliasing (for motion detection), and application-defined motion-estimation-related resource (such as vector maps for optical flow). Image correlation relative to a game may be used to directly dictate VRS pixel maps.

Another example embodiment provides a method of automatically applying VRS functionality by a GPU to control shader pixel output that supports high-tier VRS in which the method may include detecting that VRS functionality is enabled, generating a VRS pixel-rate lookup map from metadata inside a graphics device driver or from analysis of output pixel buffers, and controlling the shader pixel output using based on contents of the VRS pixel rate lookup map.

Still another example embodiment may include generating a VRS pixel rate lookup map from analysis of output pixel buffers by using one or more of luminance-value or luminance spatial-frequency thresholds and/or motion-estimation comparisons of multiple sequential frames. The luminance-value thresholds, which may be used for high or low luminance, and the luminance spatial-frequency thresholds may be used as indicators of areas on a frame buffer where pixel rates may be decreased due to known limits to human perception. The motion-estimation comparisons of multiple sequential frames may be used to indicate potential blurred areas where an increased pixel rate may be applied.

Another example embodiment may provide a method for generating the VRS pixel rate lookup map from metadata inside the graphics device driver includes using UI isolation within the graphics device driver and/or detection of temporal anti-aliasing (TAA) with an application. The UI isolation may involve one or more positions of UI elements that indicate screen-space where VRS can decrease pixel output per shader output due to the UI covering these pixel regions. In addition, detection of temporal anti-aliasing (TAA) within an application may involve a post-processing TAA buffer that may be used for a VRS pixel rate lookup map.

Yet another example embodiment may provide a graphics driver for a GPU that automatically uses VRS based on an application profile that may include hints indicating how to identify UI elements for isolation, render targets/buffers used by the application for calculating temporal anti-aliasing (i.e., motion detection), an application-defined motion-estimation-related resource (such as one or more vector maps for optical flow), and image correlation relative to a game that directly dictate VRS pixel maps.

FIG. 1 depicts typical visual images for different VRS pixel-rate variations provided by commercially available GPUs. The image at 101 is a default 1×1 pixel image. The image at 102 is a 2×1 VRS pixel-rate image, and the image at 103 is a 1×2 VRS pixel-rate image. The image at 104 is a 2×2 VRS pixel-rate image. The image at 105 is a 4×2 VRS pixel-rate image, and the image at 106 is a 2×4 VRS pixel-rate image. The image at 107 is a 4×4 pixel-rate image.

Figure 2:
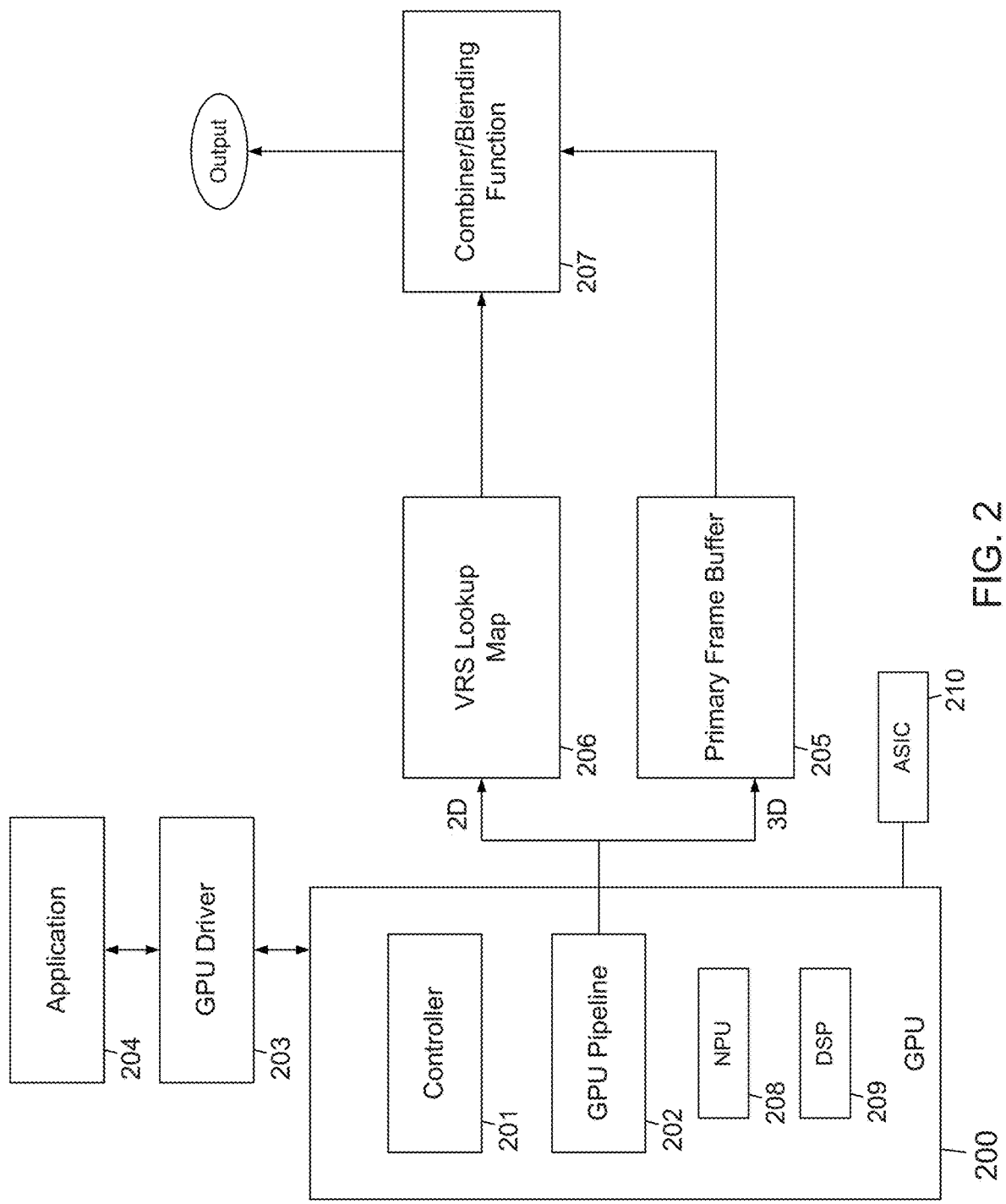
FIG. 2 is a functional block diagram of an example embodiment of a GPU that includes a capability for automatic VRS functionality according to the subject matter disclosed herein.

FIG. 2 is a functional block diagram of an example embodiment of a GPU 200 that includes a capability for automatic VRS functionality according to the subject matter disclosed herein. The GPU 200 may include a controller 201 and a graphics pipeline 202. The controller 201 may interface with and may be responsive to a GPU driver 203. An application/game 204 may interface with the GPU driver 203 for rendering on a display (not shown) coupled to the GPU. The graphics pipeline 202 may include functionality for detecting 2D and 3D draws to provide automatic VRS functionality as described herein. The graphics pipeline 202 may include, but is not limited to, one or more vertex shaders, hull shaders, geometry shaders, perspective transformers and/or pixel shaders, one or more clipping and culling stages, one or more rasterization stages, and one or more depth testing stages, all of which are not specifically shown as a pipeline configuration may be specific to a GPU embodiment. The graphics pipeline 202 may also include a primary frame buffer 205 for 3D content and a secondary buffer, or VRS lookup map, 206 for locations in a currently rendered frame for one or more 2D UIs. The primary frame buffer 206 and the VRS lookup map may be combined in a buffer 207 for output to a display (not shown). The GPU 200 may include a Neural Processing Unit (NPU) 208, and/or a Display Signal Processor (DSP) 209 to perform and/or assist for identifying UI content from 3D content. Additionally or alternatively, an Application Specific Integrated Circuit (ASIC) 210 may be coupled to the GPU 200 to perform and/or assist for identifying UI content from 3D content.

The various components and functional capabilities of the GPU 200 may be provided by one or more modules. Some embodiments of the GPU 200 may be implemented on a mobile application processor, but it should be understood that implementation is not so limited and may be implemented in other contexts, such as, a computer system that may make use of a subset of a central processing unit (CPU), GPU, NPU, and/or a DPU. Further, some embodiments may use a GPU 200 with a NN model to combine, or blend, an output of the application having VSR functionality. The automatic VRS functionality of the GPU 200 may include an on/off feature that may be selected by a user and/or an OEM when the VRS feature should be activated and it should not be activated. The level of VRS may also be selectable to provide a desired level of image quality.

VRS functionality may be selectably enabled based on different detectable image conditions. For example, a VRS-increased pixel rate may be selected for pixels underneath 2D UI elements (i.e., UI overlay detection). Pixels having a low luminance or a very high luminance may be selected for a VRS-increased pixel rate (luminance detection). That is, frame buffer regions having a relatively darker luminance or a relatively bright luminance may be selected for a VRS-increased pixel rate. Luminance detection may also be used for spatial frequency conditions (i.e., very rapid changes) and/or motion estimation conditions (i.e., motion blur) of pixels in a region.

When UI Overlay detection is enabled, the graphics driver detects draw calls related to a UI. Partitioning may attach a meta label to all draw calls considered to be a UI to mark UI pixel locations in a secondary render target. An alpha value of a UI may also be recorded to identify relatively more transparent locations of a UI so that the original pixel rate will be changed less. Prior to runtime, a profile may be generated by a GPU vendor to identify draw-call partitions to isolate 2D- and 3D-based draw calls. These UI locations can indicate areas of higher pixel shader rate (greater than 1×1) since these areas will have 2D content obscuring the original pixels.

When luminance detection is enabled, a fully rendered output frame may be post-processed (as a whole or in tiles) by the rendering GPU (or by an additionally available accelerator (NPU/DSP/CPU)) for low-luminance regions, high-luminance regions and/or luminal spatial frequency regions having very rapid changes to luminance that look blended.

For situations in which motion estimation (motion blur) may be computed by an application, the graphics driver may intercept a post-processing buffer that tracks the pixel velocities to use as a potential pixel-rate lookup map. Motion blur may be typically performed by measuring the movement of the "camera" and may be combined with velocities of objects moving in a 3D scene. The pixel-velocity information may be commonly stored in a render target/texture for post-processing effects.

Thus, detection for applying VRS may be simplified because pixel-velocity maps are commonly are generated as a post-processing step. For example, the driver may examine compute shader resources in view of this common approach for writing or reading from a pixel velocity map. Also, hints based on application profiles may be supplied to the driver based on the application title on how to find the pixel-velocity map. When found, a pixel-velocity texture provides a potential VRS map for the automatic VRS provided by the driver. Hints may also be provided by offline profiling.

When motion blur cannot be intercepted from the application, a comparison of a current frame N and a previous frame N-1 frame may be performed based on primitive location without the meta data that may be used by the application. That is, computer-vision methods for detecting movement in sequential images may be used. Such computer-vision methods may include, but are not limited to, methods to measure optical flow; methods to detect movement segmentation in sequential images/video; and/or other visual I-frame prediction methods as performed by video-compression codecs.

If motion estimation is able to be detected either by application-level pixel velocity maps or by sequential image correlation, amplitude of a motion tensor may indicate a proportional blur that may be used by increasing the pixel rate of VRS.

For all tiles of a VRS map that increase the pixel rate from native (1×1) pixel rate, it may be expected that orientation of VRS pixel blocks may coincide with the spatial similarities acquired by luminance detection. Orientation as it relates to VRS pixel blocks are not isotropic (e.g., 2×2 or 4×4 pixel blocks), but instead are anisotropic (e.g., 2×1, 1×2, 4×2 and 2×4 pixel blocks).

The UI/Luminance/Motion Estimation operations may be trained into a NN model that provides similar behavior to also create a lookup map for Tier1/Tier2 VRS based on pixel location in a render-target (framebuffer). The inference of the NN model may be calculated using an NPU/GPU/CPU or other accelerator.

Calculation of luminance/motion estimation may likely be expected to be processed once every N frames. During a frame in which luminance/motion estimation is processed, VRS functionality may be disabled to describe a rendered image with highest precision. For motion estimation, VRS functionality may be disabled more frequently to compare the (current) $N^{th}$ and the (previous) $N-1^{th}$ frames using ground-truth images. In one embodiment, VRS sampling may be reduced in proportion of motion.

Figure 3:
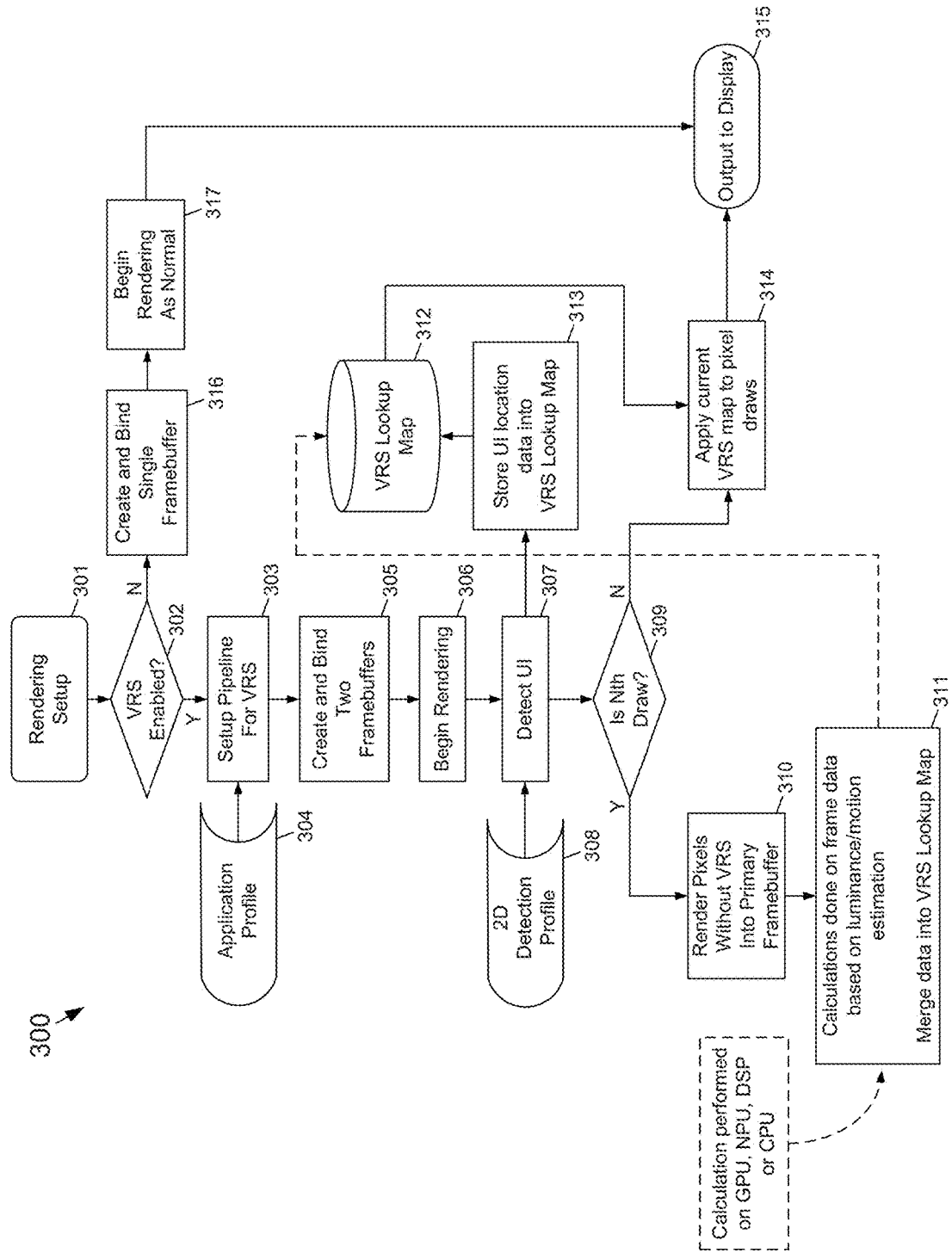
FIG. 3 is a flowchart of an example method for an automated VRS system according to the subject matter disclosed herein.

FIG. 3 is a flowchart of an example method 300 for an automated VRS system according to the subject matter disclosed herein. The method 300 starts at 301 during a rendering set up. At 302, it is determined whether an automated VRS function is enabled. If so, flow continues to 303 where a pipeline is set up for the automated VRS function. Set up of the pipeline may be based on a profile 304 of an application being run for identifying and isolating 2D UIs. Components of an application profile 304 may include one or more signatures (or characteristics) of vertex data, such as vertex count and position data; one or more signatures of textures bound to a draw call; one or more render-pass signatures/pipeline signatures for a UI draw call; one or more depth/stencil tests states at time of a draw; one or more shader signatures and/or uniform data that indicates a UI draw; and/or one or more positions of a Render-pass in a command buffer that contains a UI draw in a frame.

Flow continues to 305 where two frame buffers are created and bound to the pipeline. That is, a primary frame buffer and a secondary frame buffer are created and bound to the pipeline. At 306, rendering begins. At 307, UI detection is performed and any UI location data may be stored into a VRS lookup map at 313.

Middleware engines may be the most prevalent engines that are used for the current generation of graphics content and may provide a clean separation between scene art and construction from graphics Application Programming Interface (API) calls that drive a GPU. The separation of art/construction and the API may typically isolate 3D content from 2D overlays in source code space, and may be seen by the driver in an API stream by separation of render passes.

A UI, despite a potential Z-rejection benefit of always being on top, may be typically rendered in a last pass with an expectation that the UI does not cover many pixels, otherwise an interesting part of a scene may be obscured by relatively uninteresting status indicators. UIs may be identified based on draws that do not use high dynamic range (HDR) coloring because most UIs are flat-texture maps. Additionally, texture sample-pattern detection in a GPU shader compiler of font textures that are accessed in a very specific sub-tiling pattern to index each character of a font map may be used for identifying UIs. UIs may also be detected by detecting depth-testing being disabled. That is, because UIs are meant to be forced visible and offline dictated back to front order, no depth testing may be necessary during their rendering.

UIs may also be detected by detecting changes in a draw-parameter pattern. A standard post-processed graphics application may render a main 3D geometry with seemingly random draw parameters, followed by one or more draws containing four vertices that form a triangle-strip-generated quad. Such a quad may be used to cover an entire render target to apply a post-process operation per pixel. Because UIs are typically not per-pixel operations nor do UIs go through post-processing, it may be expected that UIs may follow the post-processing passes and may contain more than four vertices.

In one embodiment, UI detection at 307 may be based on a UI detection profile 308 in FIG. 3. FIG. 4 depicts some example 2D detection methods that may be part of a 2D detection profile 308 according to the subject matter disclosed herein. The detection profile items depicted in FIG. 4 are exemplary only and not a comprehensive list. Item 308a in FIG. 4 relates to a change in draw parameter pattern may be used to identify a 2D UI overlay. For example, a post-processed graphics application may render main 3D geometry with apparently random draw parameters, followed by one or more draws containing four vertices that constitutes a triangle strip generated quad. The quad may be used to cover a portion of or an entire render target to apply a post-process operation per pixel. Because UIs may not be per-pixel operations, and/or they may not be processed through post-processing, they may follow the post-process passes and may contain more than a four vertices and, thereby, be detected as a 2D UI overlay.

Item 308b relates to detecting a 2D UI overlay by identifying specific shaders as being bound to the pipeline that are only used for UI rendering. These specific shaders may, for example, not use skinning or high dynamic range coloring. Draws that do not use HDR coloring may be detected as 2D UI content because UIs are flat texture maps.

Item 308c relates to detecting a 2D UI, despite a potential z-rejection benefit of being on top, as typically being rendered during a last render pass of a frame with the expectation that the UI should not cover many pixels, otherwise an interesting portion of the scene may be obscured by relatively uninteresting status indicators. Also, it is typically the last draw in a frame because it is always on top and will always overwrite competing pixels.

Item 308d relates to font textures that may be detected by indexing into a single texture in small equal sized boxes. A 2D UI overlay may be identified as a texture sample pattern in a GPU shader compiler of font textures that may be accessed in a specific sub-tiling pattern to index one or more characters of a font map.

Item 308e relates to disabled depth testing, which may be used to identify a 2D UI overlay because UIs are typically forced to be visible and offline dictated back to front order, so no depth testing is used during their rendering.

Returning to FIG. 3, at 309 it is determined whether frame draw is the $N^{th}$ frame draw. If so, flow continues to 310 where pixels are rendered into the primary frame buffer without VRS. At 311, calculations are performed based on luminance and motion estimation. The calculations may be performed by the GPU, a NPU, a DSP and/or a CPU. The resulting data from the luminance and motion estimation calculations are merged into the VRS lookup map at 312.

If, at 309, it is determined that the frame draw is not the $N^{th}$ draw, flow continues to 314 where the current VRS lookup map at 312 is applied to the pixel draws. From 314, flow continues to 315 where the output is sent to the display.

If, at 302 in FIG. 3, it is determined that the automated VRS functionality is not enabled, flow continues to 316 where a single frame buffer is created and bound to the pipeline. At 317, rendering as normal begins. Flow continues to 315 where the output is sent to the display.

For a particular application title, pre-arranged hints may be compiled into an application profile, such as application profile 304, to improve 2D UI isolation. This may not be necessary if the approaches described in connection with UI detection at 307 are deemed sufficient. If no suitable techniques for 2D UI isolation are provided for a particular application and the result of isolating the UI is poor, the profile may hint may be to completely disable the automated VRS functionality for UI isolation, in which case flow in FIG. 3 would be from 303 to 316.

Figure 5:
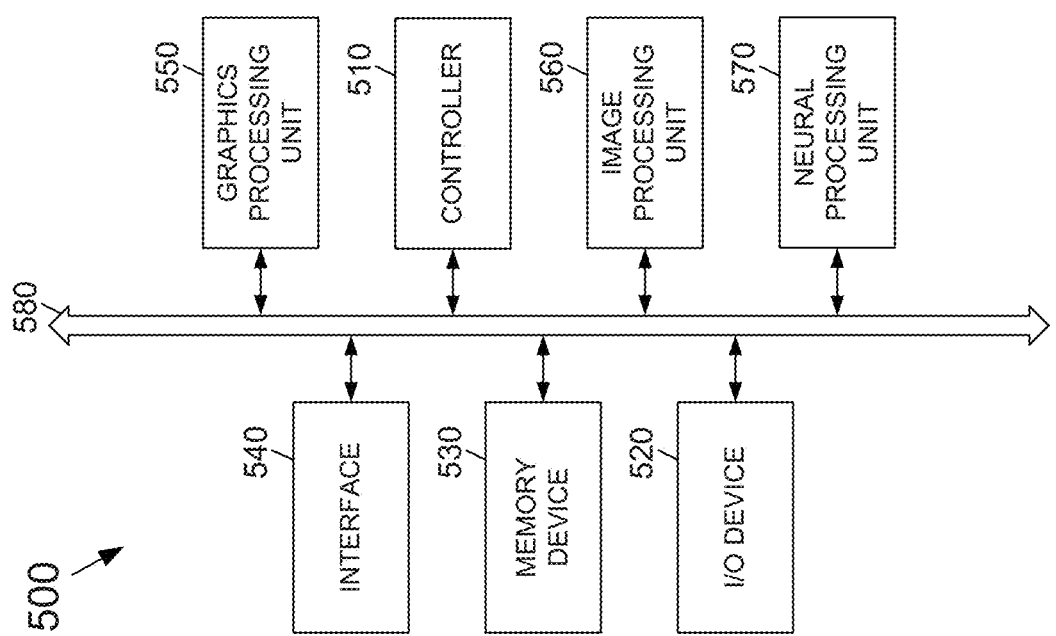
FIG. 5 depicts an electronic device that includes a GPU that may increase a pixel-rate as an optional feature without an explicit implementation from within an application according to the subject matter disclosed herein.

FIG. 5 depicts an electronic device 500 that includes a GPU that may increase a pixel-rate as an optional feature without an explicit implementation from within an application according to the subject matter disclosed herein. The electronic device 500 may include a controller (or CPU) 510, an input/output device 520 such as, but not limited to, a keypad, a keyboard, a display, a touch-screen display, a camera, and/or an image sensor, a memory 530, an interface 540, a GPU 550, an imaging-processing unit 560, and a neural processing unit 570 that are coupled to each other through a bus 580. The controller 510 may include, for example, at least one microprocessor, at least one digital signal processor, at least one microcontroller, or the like. The memory 530 may be configured to store a command code to be used by the controller 510 or a user data.

Electronic device 500 and the various system components of electronic device 500 may include the image processing unit 560 that may include a GPU that may increase a pixel-rate as an optional feature without an explicit implementation from within an application according to the subject matter disclosed herein. The GPU 550 may also be capable of increasing a pixel-rate as an optional feature without an explicit implementation from within an application. The interface 540 may be configured to include a wireless interface that is configured to transmit data to or receive data from a wireless communication network using a RF signal. The wireless interface 540 may include, for example, an antenna. The electronic system 500 also may be used in a communication interface protocol of a communication system, such as, but not limited to, Code Division Multiple Access (CDMA), Global System for Mobile Communications (GSM), North American Digital Communications (NADC), Extended Time Division Multiple Access (E-TDMA), Wideband CDMA (WCDMA), CDMA2000, Wi-Fi, Municipal Wi-Fi (Muni Wi-Fi), Bluetooth, Digital Enhanced Cordless Telecommunications (DECT), Wireless Universal Serial Bus (Wireless USB), Fast low-latency access with seamless handoff Orthogonal Frequency Division Multiplexing (Flash-OFDM), IEEE 802.20, General Packet Radio Service (GPRS), iBurst, Wireless Broadband (WiBro), WiMAX, WiMAX-Advanced, Universal Mobile Telecommunication Service-Time Division Duplex (UMTS-TDD), High Speed Packet Access (HSPA), Evolution Data Optimized (EVDO), Long Term Evolution-Advanced (LTE-Advanced), Multichannel Multipoint Distribution Service (MMDS), Fifth-Generation Wireless (5G), Sixth-Generation Wireless (6G), and so forth.

Embodiments of the subject matter and the operations described in this specification may be implemented in digital electronic circuitry, or in computer software, firmware, or hardware, including the structures disclosed in this specification and their structural equivalents, or in combinations of one or more of them. Embodiments of the subject matter described in this specification may be implemented as one or more computer programs, i.e., one or more modules of computer-program instructions, encoded on computer-storage medium for execution by, or to control the operation of data-processing apparatus. Alternatively or additionally, the program instructions can be encoded on an artificially-generated propagated signal, e.g., a machine-generated electrical, optical, or electromagnetic signal, which is generated to encode information for transmission to suitable receiver apparatus for execution by a data processing apparatus. A computer-storage medium can be, or be included in, a computer-readable storage device, a computer-readable storage substrate, a random or serial-access memory array or device, or a combination thereof. Moreover, while a computer-storage medium is not a propagated signal, a computer-storage medium may be a source or destination of computer-program instructions encoded in an artificially-generated propagated signal. The computer-storage medium can also be, or be included in, one or more separate physical components or media (e.g., multiple CDs, disks, or other storage devices). Additionally, the operations described in this specification may be implemented as operations performed by a data-processing apparatus on data stored on one or more computer-readable storage devices or received from other sources.

While this specification may contain many specific implementation details, the implementation details should not be construed as limitations on the scope of any claimed subject matter, but rather be construed as descriptions of features specific to particular embodiments. Certain features that are described in this specification in the context of separate embodiments may also be implemented in combination in a single embodiment. Conversely, various features that are described in the context of a single embodiment may also be implemented in multiple embodiments separately or in any suitable subcombination. Moreover, although features may be described above as acting in certain combinations and even initially claimed as such, one or more features from a claimed combination may in some cases be excised from the combination, and the claimed combination may be directed to a subcombination or variation of a subcombination.

Similarly, while operations are depicted in the drawings in a particular order, this should not be understood as requiring that such operations be performed in the particular order shown or in sequential order, or that all illustrated operations be performed, to achieve desirable results. In certain circumstances, multitasking and parallel processing may be advantageous. Moreover, the separation of various system components in the embodiments described above should not be understood as requiring such separation in all embodiments, and it should be understood that the described program components and systems can generally be integrated together in a single software product or packaged into multiple software products.

Thus, particular embodiments of the subject matter have been described herein. Other embodiments are within the scope of the following claims. In some cases, the actions set forth in the claims may be performed in a different order and still achieve desirable results. Additionally, the processes depicted in the accompanying figures do not necessarily require the particular order shown, or sequential order, to achieve desirable results. In certain implementations, multitasking and parallel processing may be advantageous.

As will be recognized by those skilled in the art, the innovative concepts described herein may be modified and varied over a wide range of applications. Accordingly, the scope of claimed subject matter should not be limited to any of the specific exemplary teachings discussed above, but is instead defined by the following claims.

What is claimed is:

1. A method to vary pixel rate in a Graphics Processing Unit (GPU), the method comprising:
   detecting, by the GPU, user interface (UI) content in a draw call of an application;
   generating, by the GPU, a variable-rate shader lookup map based on at least one location of detected UI content in the draw call; and
   increasing, by the GPU, a pixel rate of 3D content of the draw call based on the variable-rate shader lookup map, wherein the UI content is detected by the GPU without instructions from an Application Programming Interface (API) within the application to detect the UI content, or without instructions from the API to initiate variable rate shading on the application in the GPU.

2. The method of claim 1, further comprising determining, by the GPU, at least one location in the 3D content that corresponds to a predetermined luminance-value threshold or a predetermined luminance spatial-frequency threshold,
   wherein generating the variable-rate shader lookup map is further based on the at least one location in the 3D content that corresponds to the predetermined luminance-value threshold or the predetermined luminance spatial-frequency threshold.

3. The method of claim 2, wherein the at least one location in the 3D content comprises a location having a luminance value that is less than the predetermined luminance-value threshold or luminance spatial-frequency value that is less than the predetermined luminance spatial-frequency threshold.

4. The method of claim 2, wherein the at least one location in the 3D content comprises a location having a luminance value that is greater than the predetermined luminance-value threshold or a luminance spatial-frequency value that is greater than the predetermined luminance spatial-frequency threshold.

5. The method of claim 1, further comprising determining at least one location in the 3D content that corresponds to a predetermined motion-estimation threshold, and
   wherein generating the variable-rate shader lookup map is further based on the at least one location in the 3D content that corresponds to the predetermined motion-estimation threshold.

6. The method of claim 1, wherein detecting UI content in the draw call comprises detecting the UI content based on a profile of the application.

7. The method of claim 1, further comprising detecting, by the GPU, a post-processing temporal anti-aliasing buffer or data that corresponds to temporal anti-aliasing that is used for the variable-rate shader lookup map.

8. The method of claim 1, wherein detecting UI content in the draw call comprises at least one of:
   determining that the draw call comprises a 2D draw call based on two triangles being detected as a box;
   determining that the draw call comprises a 2D draw call based on detecting a shader that is bound to a pipeline of the GPU that will be used for a UI;
   determining that the draw call comprises a 2D draw call based on detecting that the draw call does not use skinning or high-dynamic range coloring to render the draw;

determining that the draw call comprises a 2D draw call based on determining that the draw call is rendered during a last pass of a frame;

determining that the draw call comprises a 2D draw call based on determining a single texture is indexed into small equal box sizes to indicate font retrieval; or determining that the draw call comprises a 2D draw call based on determining that a depth test for the draw call is disabled, a draw-call order or rendering quadrants of the draw call.

9. A method to vary pixel rate in a Graphics Processing Unit (GPU), the method comprising:
determining, by the GPU, at least one location in 3D content of a draw call of an application that corresponds to a predetermined luminance-value threshold, a predetermined luminance spatial-frequency threshold, or a predetermined motion-estimation threshold;
generating, by the GPU, a variable-rate shader lookup map based on at least one location that corresponds to the predetermined luminance-value threshold, the predetermined luminance spatial-frequency threshold, or the predetermined motion-estimation threshold;
detecting, by the GPU, user interface (UI) content in the draw call; and
increasing, by the GPU, a pixel rate of the 3D content corresponding the at least one location corresponding to the predetermined luminance-value threshold, the predetermined luminance spatial-frequency threshold, or the predetermined motion-estimation threshold, wherein the UI content is detected by the GPU without instructions from an Application Programming Interface (API) within the application to detect the UI content, or without instructions from the API to initiate variable rate shading on the application in the GPU.

10. The method of claim 9, wherein the at least one location in the 3D content corresponds to a location having a luminance value that is less than the predetermined luminance-value threshold, a luminance spatial-frequency value that is less than the predetermined luminance spatial-frequency threshold value, or a motion-estimation value that is less than the predetermined motion-estimation value threshold.

11. The method of claim 9, wherein the at least one location in the 3D content corresponds to a location having a luminance value that is greater than the predetermined luminance-value threshold, a luminance spatial-frequency value that is greater than the predetermined luminance spatial-frequency value, or a motion-estimation value that is greater than the predetermined motion-estimation value threshold.

12. The method of claim 9, further comprising detecting, by the GPU, a post-processing temporal anti-aliasing buffer or data that corresponds to temporal anti-aliasing that is used for the variable-rate shader lookup map.

13. The method of claim 9, further comprising detecting, by the GPU, user interface (UI) content in the draw call, wherein generating the variable-rate shader lookup map further comprises generating the variable-rate shader lookup map further based on at least one location of detected UI content in the draw call, and
wherein increasing the pixel rate of the 3D content is further based on the at least one location of detected UI content.

14. The method of claim 13, wherein detecting UI content in the draw call comprises detecting the UI content based on a profile of the application.

15. The method of claim 13, wherein detecting UI content in the draw call comprises at least one of:
determining that the draw call comprises a 2D draw call based on two triangles being detected as a box;
determining that the draw call comprises a 2D draw call based on detecting a shader that is bound to a pipeline of the GPU that will be used for a UI;
determining that the draw call comprises a 2D draw call based on detecting that the draw call does not use skinning or high-dynamic range coloring to render the draw;
determining that the draw call comprises a 2D draw call based on determining that the draw call is rendered during a last pass of a frame;
determining that the draw call comprises a 2D draw call based on determining a single texture is indexed into small equal box sizes to indicate font retrieval; or
determining that the draw call comprises a 2D draw call based on determining that a depth test for the draw call is disabled, a draw-call order or rendering quadrants of the draw call.

16. A graphics processing unit (GPU), comprising:
a graphics pipeline configured to increase a pixel rate of rendered content; and
a controller coupled to the graphics pipeline, the controller being configured to:
detect user interface (UI) content in a draw call of an application or at least one location in 3D content of the draw call that corresponds to a predetermined luminance-value threshold, a predetermined luminance spatial-frequency threshold, or to a predetermined motion-estimation threshold,
generate a variable-rate shader lookup map based on the at least one location of detected UI content in the draw call and the at least one location in the 3D content that corresponds to the predetermined luminance-value threshold, the predetermined luminance spatial-frequency threshold, or the predetermined motion-estimation threshold, and
increase a pixel rate of the 3D content corresponding based on the variable-rate shader lookup map, wherein the UI content is detected by the GPU without instructions from an Application Programming Interface (API) within the application to detect the UI content, or without instructions from the API to initiate variable rate shading on the application in the GPU.

17. The GPU of claim 16, wherein the at least one location in the 3D content comprises a location having a luminance value that is less than the predetermined luminance-value threshold, a luminance spatial-frequency value that is less than the predetermined luminance spatial-frequency value, or a motion-estimation value that is less than the predetermined motion-estimation value threshold.

18. The GPU of claim 16, wherein the at least one location in the 3D content comprises a location having a luminance value that is greater than the predetermined luminance-value threshold, a luminance spatial-frequency value that is greater than the predetermined luminance spatial-frequency value, or a motion-estimation value that is greater than the predetermined motion-estimation value threshold.

19. The GPU of claim 16, wherein detecting UI content in the draw call comprises detecting the UI content based on a profile of the application.

20. The GPU of claim 16, wherein the controller is further configured to detect a post-processing temporal anti-aliasing buffer or related data that corresponds to temporal anti-aliasing that is used for the variable-rate shader lookup map.

\* \* \* \* \*